United States Patent [19]
Nishida

[11] Patent Number: 5,995,828
[45] Date of Patent: *Nov. 30, 1999

[54] PORTABLE HANDY PHONE SYSTEM

[75] Inventor: Moritsugu Nishida, Fukuoka, Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/493,826

[22] Filed: Jun. 22, 1995

[30] Foreign Application Priority Data

Jun. 24, 1994 [JP] Japan .................................. 6-142108

[51] Int. Cl.$^6$ ................................................. H04M 7/00
[52] U.S. Cl. ........................... 455/417; 455/432; 455/426
[58] Field of Search ................................ 379/58, 59, 63, 379/61; 455/33.1, 554, 555, 556, 553, 417, 432

[56] References Cited

U.S. PATENT DOCUMENTS

| | | | |
|---|---|---|---|
| 4,528,656 | 7/1985 | Morais | 379/58 |
| 4,734,928 | 3/1988 | Weiner et al. | 455/551 |
| 4,922,517 | 5/1990 | West, Jr. et al. | 379/58 |
| 4,980,907 | 12/1990 | Raith et al. | 379/63 |
| 5,101,500 | 3/1992 | Marui | 455/33.1 X |
| 5,210,786 | 5/1993 | Itoh | 379/59 |
| 5,239,674 | 8/1993 | Comroe et al. | 455/426 |
| 5,260,988 | 11/1993 | Shellinger et al. | 455/553 |
| 5,315,637 | 5/1994 | Breeden et al. | 379/63 X |
| 5,371,898 | 12/1994 | Grube et al. | 455/426 |
| 5,437,053 | 7/1995 | Sawa et al. | 455/551 |
| 5,463,675 | 10/1995 | Gerzberg | 455/551 |
| 5,475,677 | 12/1995 | Arnold et al. | 455/552 X |
| 5,544,226 | 8/1996 | Weis et al. | 379/61 |
| 5,544,227 | 8/1996 | Blust et al. | 379/58 X |
| 5,586,338 | 12/1996 | Lynch et al. | 455/33.1 X |
| 5,613,213 | 3/1997 | Naddell et al. | 455/54.1 |
| 5,659,598 | 8/1997 | Byrne et al. | 455/553 |

*Primary Examiner*—David R. Hudspeth
*Assistant Examiner*—Daniel Abebe
*Attorney, Agent, or Firm*—Pollock, Vande Sande & Amernick

[57] ABSTRACT

A portable handy phone system comprises a first radio base station connected to a telephone network for executing radio communication with portable handy phones existing in a first radio communication zone, and a second radio base station connected to the telephone network for executing radio communication with portable handy phones existing in a second radio communication zone different from the first radio communication zone. The first radio base station comprises a first radio interface section for executing radio communication with portable handy phones in the first radio communication zone, a first system-to-system interface section for communicating with the second radio base station, and a first control section. The first control section responds to an incoming call from the telephone network designated to a portable handy phone existing in the first radio communication zone, causes the designated portable handy phone to receive the incoming call through the first radio interface section, and causes the first system-to-system interface section to transmit information relating to the designated portable handy phone to the second radio base station.

23 Claims, 4 Drawing Sheets

PORTABLE HANDY PHONE SYSTEM

BACKGROUND OF THE INVENTION

1. Field of the Invention

This invention relates to a portable handy phone system allowing us to utilize both public radio telephone services and private radio telephone services by the same portable handy phone.

2. Prior Art

Conventionally, the public radio telephone services allow their subscribers to use portable handy phones, represented by automotive vehicle telephones and cellular phones, in a wide outdoor service area. Meanwhile, the private radio telephone services allow their subscribers to use portable handy phones in a limited facility as handset units through radio communication with a base station of a private branch exchange.

The public radio telephone services are expected to have a huge communication zone sufficient to allow subscribers moving outdoor to continuously use their handy phones without interruptions of communication. To this end, a public radio base station for the public radio telephone services is required to be a large scale radio connection apparatus.

On the other hand, the private radio telephone services are limited to in-house uses, which require a relatively narrow communication zone. Thus, a private radio base station is normally a small scale equipment installable in a private facility. Thus, function and mechanism of each portable handy phone is differentiated in accordance with the type of radio telephone service to be used. In other words, conventional portable handy phones are dedicated to only one of these two kinds of radio telephone services.

That is, the public radio telephone services and the private radio telephone services have been conventionally considered as being totally different from each other in view of difference of users, scale of facilities, etc.

However, a demand toward outdoor use of handy phones dedicated to the private radio telephone services is gradually increasing. Meanwhile, if a reduction of communication zone is permitted to a certain degree, it will be feasible to downsize each public radio base station so that the scale of each public radio base station becomes comparable to the facility of the private radio base station.

SUMMARY OF THE INVENTION

Accordingly, in view of above-described problems encountered in the prior art, a principal object of the present invention is to provide a portable handy phone system allowing a portable handy phone to receive an incoming call whenever the call is designated to the telephone number of that portable handy phone registered in the public radio base station, even if that handy phone is in a private communication zone out of the public communication zone of its subscribing public radio telephone service, or even if the mode of the handy phone is switched to a private mode dedicated to the private radio telephone service which does not monitor an incoming-call notifying channel. Furthermore, the present invention provides a portable handy phone system capable of automatically executing a location registration for the public communication zone as soon as the location registration is done in a private communication zone, even if a user of the handy phone continuously stays in the private communication zone.

In order to accomplish these and other related objects, a first aspect of the present invention provides a portable handy phone system comprising a first radio base station connected to a telephone network for executing radio communication with portable handy phones existing in a first radio communication zone, and a second radio base station connected to the telephone network for executing radio communication with portable handy phones existing in a second radio communication zone different from the first radio communication zone, wherein the first radio base station comprises: a first radio interface section for executing radio communication with portable handy phones in the first radio communication zone; a first system-to-system interface section for communicating with the second radio base station; and a first control section for responding to an incoming call received from the telephone network and designated to a portable handy phone existing in the first radio communication zone, causing the designated portable handy phone to receive the incoming call through the first radio interface section, and causing the first system-to-system interface section to transmit information relating to the designated portable handy phone to the second radio base station.

In the above first aspect portable handy phone system, it is desirable that the first radio communication zone is a public communication zone. The second radio base station is a private branch exchange allowing portable handy phones to execute radio communication in a private communication zone serving as the second radio communication zone. Furthermore, the information relating to the designated portable handy phone, transmitted from the first system-to-system interface section to the second radio base station, is a telephone number of the designated portable handy phone effective in the first radio communication zone. Moreover, it is preferable that the second radio base station comprises: a second system-to-system interface section for communicating with the first system-to-system interface section; a second radio interface section for executing radio communication with portable handy phones in the second radio communication zone; and a second control section for controlling the second radio interface section to allow a corresponding portable handy phone in the second radio communication zone to receive the incoming call, when the second system-to-system interface section receives the information relating to the designated portable handy phone transmitted from the first system-to-system interface section. Still further, it is preferable that the second radio base station comprises a conversion section for converting the information relating to the designated portable handy phone transmitted from the first radio base station into an information relating to the corresponding portable handy phone effective in the second radio communication zone; and the second control section controls the conversion section in response to reception of the information relating to the designated portable handy phone transmitted from the first system-to-system interface section to the second system-to-system interface section, so as to obtain a converted information representing the corresponding portable handy phone, allowing the corresponding portable handy phone to receive the incoming call based on the converted information.

A second aspect of the present invention provides a portable handy phone system comprising a first radio base station connected to a telephone network for forming a first radio communication zone, a second radio base station connected to the telephone network for forming a second radio communication zone different from the first radio communication zone, and a portable handy phone having a first radio communication mode for communicating with the first radio base station in the first radio communication zone and a second radio communication mode for communicating with the second radio base station in the second radio communication zone. The first radio base station comprises: a first radio interface section for executing radio communication with the portable handy phone; a first system-to-system interface section for communicating with the second radio base station; and a first control section for responding to an incoming call received from the telephone network and designated to the portable handy phone, causing the portable handy phone to receive the incoming call through the first radio interface section, and causing the first system-to-system interface to transmit information relating to the portable handy phone to the second radio base station.

In the above second aspect portable handy phone system, it is desirable that first radio communication zone is a public communication zone. The second radio base station is a private branch exchange allowing portable handy phones to execute radio communication in a private communication zone serving as the second radio communication zone. The information relating to the portable handy phone, transmitted from the first system-to-system interface section to the second radio base station, is a telephone number of the portable handy phone effective in the first radio communication zone. Furthermore, it is preferable that the second radio base station comprises: a second system-to-system interface section for communicating with the first system-to-system interface section; a second radio interface section for communicating with the portable handy phone in the second radio communication zone; and a second control section for controlling the second radio interface section to allow the portable handy phone in the second radio communication zone to receive the incoming call, when the second system-to-system interface section receives the information relating to the portable handy phone transmitted from the first system-to-system interface section. Yet further, it is preferable that the second radio base station comprises a conversion section for converting the telephone number of the portable handy phone effective in the first radio communication zone into a telephone number of the portable handy phone effective in the second radio communication zone; and the second control section controls the conversion section in response to reception of the telephone number of the portable handy phone effective in the first radio communication zone transmitted from the first system-to-system interface section to the second system-to-system interface section, so as to obtain the telephone number of the portable handy phone effective in the second radio communication zone, allowing the portable handy phone to receive the incoming call based on the obtained telephone number.

With above arrangements, the present invention makes it possible realize to a portable handy phone system allowing us to utilize both public radio telephone services and private radio telephone services by the same portable handy phone. More specifically, when the handy phone goes out of the public communication zone, after having been executed a location registration in the public base station, and moves into a private communication zone, or when the communication mode of the handy phone is switched to a private mode dedicated to the private radio telephone service not monitoring the incoming call notifying channel, a private branch exchange (PBX) automatically converts the incoming call directed to the public telephone number registered in the public base station to an incoming call directed to a corresponding extension telephone number in the private branch exchange (PBX) with reference to the connection between the public telephone numbers and the extension telephone numbers administrated by the phone number conversion section.

Moreover, when a user of the handy phone continuously stays in a particular private communication zone provided by a private branch exchange (PBX), the private branch exchange (PBX) automatically executes a location registration for the public communication zone at the same time as completion of the location registration in the private communication zone.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 1:
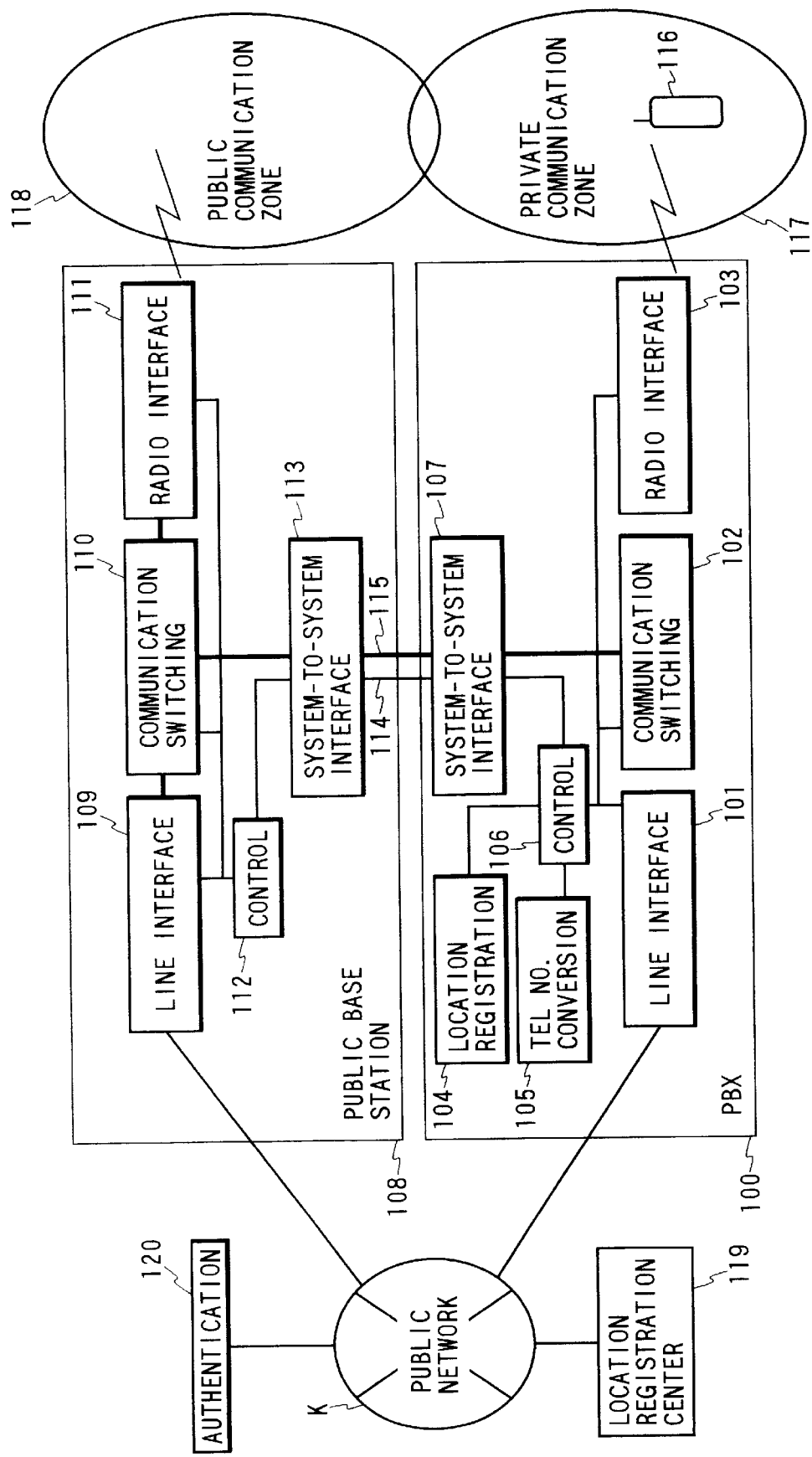
FIG. 1 is a block diagram showing a handy phone system in accordance with one embodiment of the present invention.

A preferred embodiment of the present invention will be explained in greater detail hereinafter, with reference to the accompanying drawings. Identical parts are denoted by identical reference numeral throughout views.

FIG. 1 is a block diagram showing a portable handy phone system in accordance with one embodiment of the present invention. In FIG. 1, a private branch exchange (PBX) 100 provides a private radio telephone service. On the other hand, a public radio telephone service is provided by a public radio base station 108, a location registration center 119 and an authentication center 120. A portable handy phone 116 has a capability of realizing radio communication utilizing the private radio telephone service and the public radio telephone service by selectively switching frequencies.

The private branch exchange 100 has a line interface section 101 connected to a public network K having a plurality of communication channels, and a radio interface section 103 providing a plurality of communication channels for radio communication to the portable handy phone 116. A communication path switching section 102 selects a combination between plural channels of the line interface section 101 and the plural channels of the radio interface section 103, so as to switch and form a communication path between the public network K and the designated portable handy phone 116. A location registration section 104 administrates information relating to presence or absence of the portable handy phone 116 in a private communication zone 117 of the private branch exchange 100. A phone number conversion section 105 memorizes relation between extension phone numbers in the private branch exchange 100 and the public phone numbers allocated in accordance with subscription of each handy phone 116 to the public radio telephone service.

The public radio base station 108 comprises a line interface section 109, a radio interface section 111 and a communication path switching section 110 which are similar to those of the private branch exchange 100, thereby forming a public communication zone 118 enabling a location-registered communication in the public radio telephone service.

The private branch exchange 100 and the public radio base station 108 have system-to-system interfaces 107 and 113, respectively. These system-to-system interfaces 107 and 113 are connected to each other via a control line 114 transmitting various control information and a communication channel 115. These system-to-system interfaces 107 and 113 enable message communication between a control section 106 provided in the private branch exchange 100 and a control section 112 provided in the public radio base station 108, and also establish a communication path connecting selected public and private communication channels between the line interface section 109 and the radio interface section 103 or between the line interface section 101 and the radio interface section 111.

The private branch exchange 100 and the public radio base station 108 are so closely located that a user or subscriber carrying the handy phone 116 is frequently movable between the private communication zone 117 and the public communication zone 118, or the two zones are partly overlapped. For example, the common area of the first floor of a building can be provided for the public communication zone 118 of the public radio base station 108, while other floors are provided for the private communication zone 117 of the private branch exchange 100. Another example representing the overlap of two zones 117 and 118 would be, for example, a coexistence of a public radio telephone service for shopping customers and a private radio telephone service for clerks working on the same floor in a department store.

Functions of above-described blocks will be explained hereinafter, with reference to the sequence of a response of the handy phone to a public incoming call shown in FIGS. 2 and 3, and the sequence of a location registration shown in FIG. 4.

Figure 2:
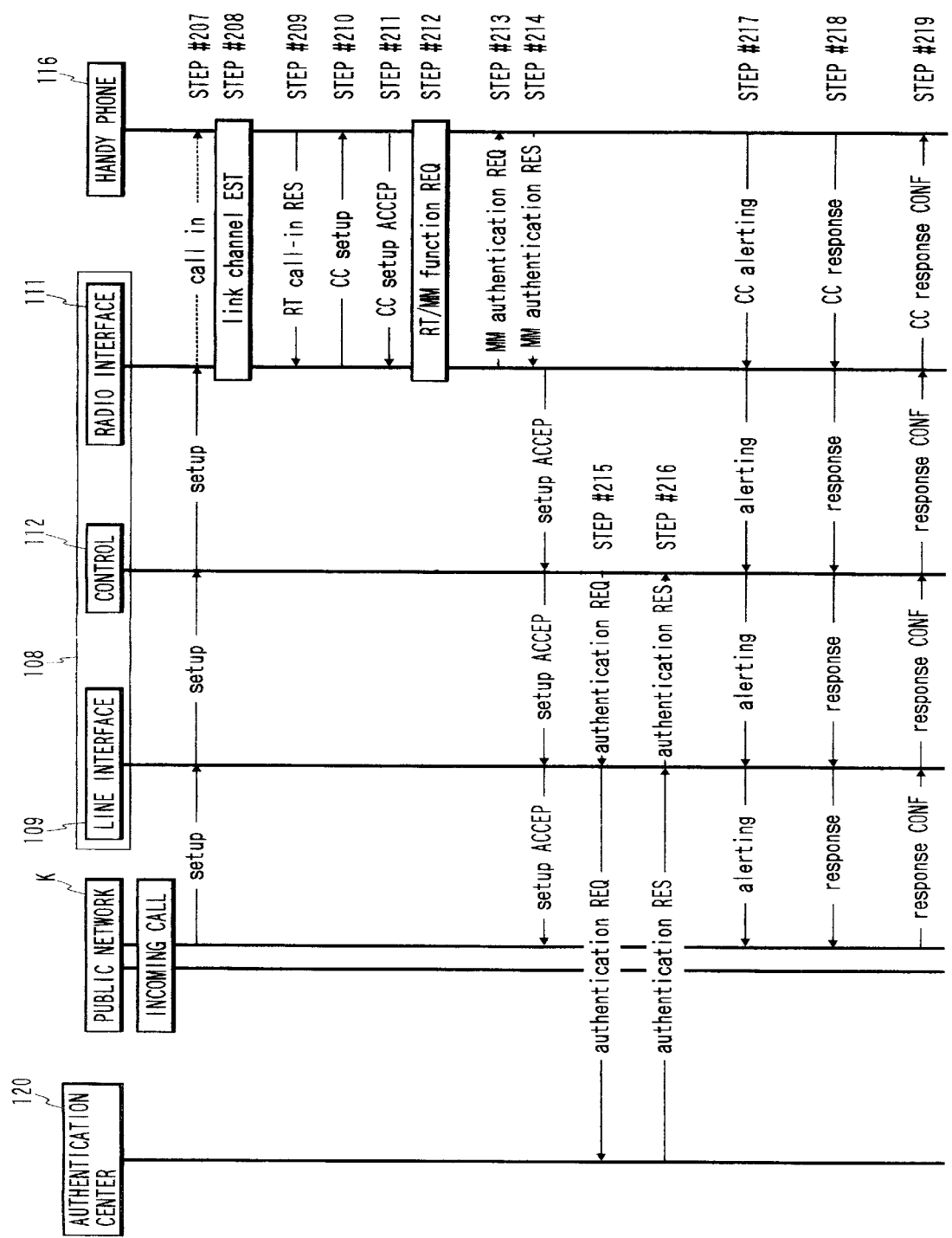
FIG. 2 is a sequence diagram showing a response of a handy phone to a public incoming call in a public communication zone in accordance with the embodiment of the present invention.

FIG. 2 is a sequence diagram showing a response of the handy phone to a public incoming call when the handy phone exists in the public communication zone of the public radio base station. First, an incoming call from the public network K is transmitted to the line interface section 109, the control section 112, and the radio interface section 111, successively, in the public radio base station 108. The radio interface section 111, in response to this incoming call, sends out a call-in message using an incoming-call notifying channel (Step #207). The handy phone 116, in a standby condition for any incoming call, always monitors the notifying channel to establish a radio link channel communicatable with the radio interface section 111 as soon as the incoming call directed to its own telephone number is received. (Step #208)

After establishing the radio link channel, a series of procedures (i.e. three steps of RT call-in response, CC setup and CC setup acceptance specified in Steps #209, #210 and #211) is performed through the radio link channel between the radio interface section 111 and the handy phone 116 for confirming an acceptance of the incoming call. Subsequently, another series of procedures (i.e. three steps of RT/MM function request, MM authentication request and MM authentication response specified in Steps #212, #213 and #214) is performed through the radio link channel between the radio interface section 111 and the handy phone 116 for confirming mutual connection through interfaces.

When the procedures of confirming connection between the handy phone 116 and the radio interface section 111 are once finished, a setup acceptance signal indicating acceptance of the incoming call is transmitted from the radio interface section 111 to the control section 112, the line interface section 109 and the public network K, successively (Step #214). At the same time, a procedure (i.e. two steps of authentication request and authentication response specified in Steps #215 and #216) is carried out between the control section 112 and the authentication center 120 via the line interface section 109 for checking as to whether the inquired handy phone 116 is a registered subscriber for the public radio telephone service. Meanwhile, if the procedures specified by the steps #207 through #214 confirm the mutual connection through the radio interfaces, the handy phone 116 starts ringing bell and notifies a caller of it (i.e. CC alerting in Step #217).

Next, upon receiving a response from the handy phone 116 (i.e. CC response in Step #218), the communication path switching section 110 forms a communication path by connecting a communication channel between the line interface section 109 and the radio interface section 111. Then, the line interface section 109 sends a response to the public network K. In return, a response confirmation signal is transmitted from the public network K to the line interface 109, the control section 112 and the radio interface section 111, successively. Thus, the radio interface section 111 sends the handy phone 116 a CC response confirmation signal, thereby establishing a communication enabling condition. (Steps #218 and #219)

Figure 3:
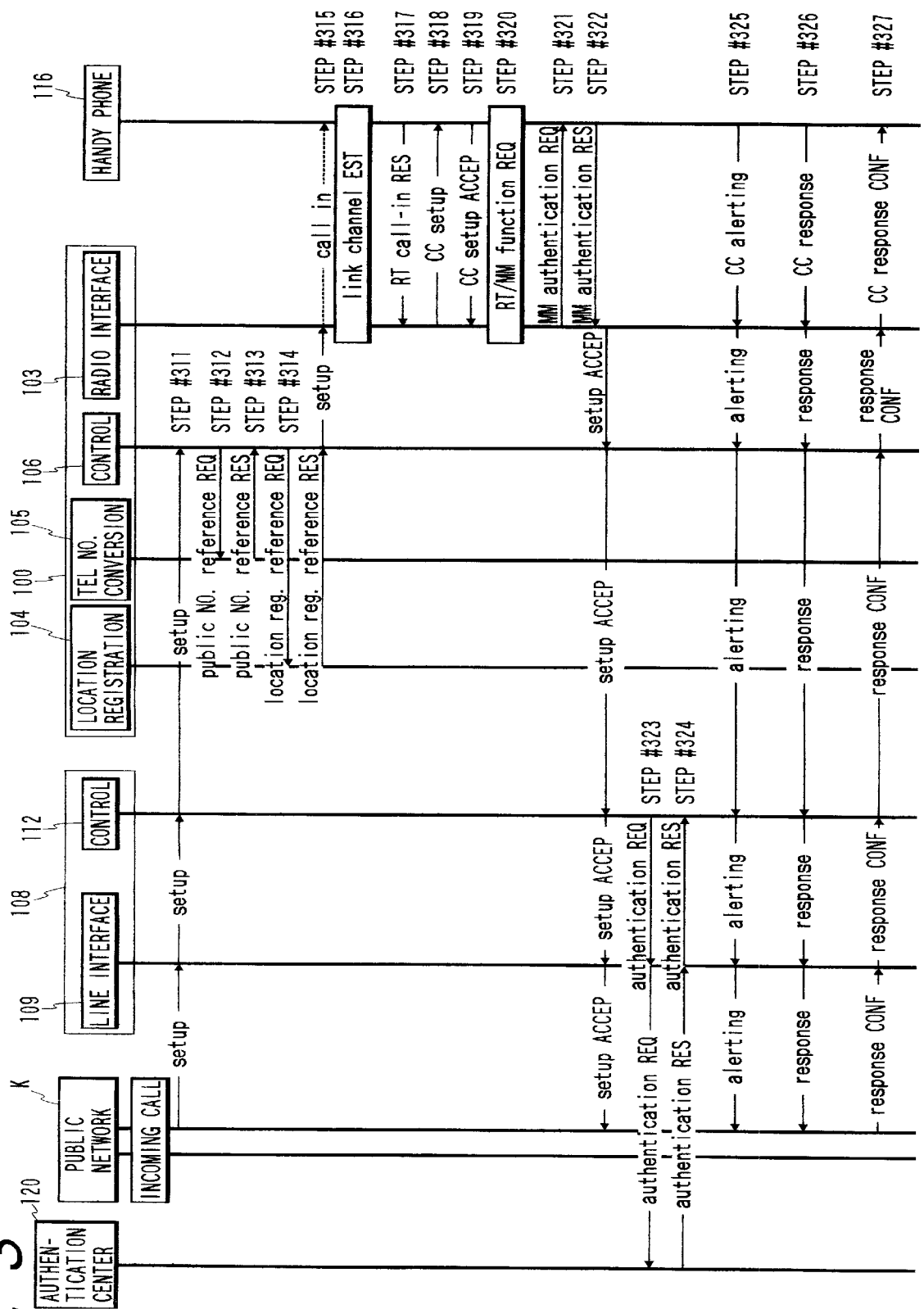
FIG. 3 is a sequence diagram showing a response of the handy phone to a public incoming call in a private communication zone in accordance with the embodiment of the present invention.

Next, FIG. 3 is a sequence diagram showing a response of the handy phone to a public incoming call when the handy phone moves and stays in the private communication zone of the private branch exchange (PBX) after having completed the location registration in the public radio base station. First, an incoming call from the public network K is transmitted to the line interface section 109 and the control section 112, successively, in the public radio base station 108. The control section 112 notifies the radio interface section 103 in the private branch exchange 100 of the incoming call received from the public network K, and also notifies the control section 106 via the control line 114 of the public telephone number of the designated portable handy phone. (Step #311)

The control section 106 in the private branch exchange 100 sends an inquiry to the phone number conversion section 105 to check whether any extension telephone number administrated by the private branch exchange 100 coincides with the public telephone number designated by the incoming call (Steps #312 and #313).

If the inquired telephone number is a registered one, it is then checked by the location registration section 104 whether a handy phone having the corresponding extension telephone number is present in the private communication zone 117. (i.e. steps of location registration reference request, location registration reference response, and setup specified in Steps #314 and #315)

If it is confirmed that the handy phone having the same telephone number as the telephone number designated by the incoming call is actually present in the private communication zone 117, the radio interface section 103 sends out a call-in message using an incoming-call notifying channel (Step #315). The handy phone 116, in a standby condition for any incoming call, always monitors the notifying channel to establish a radio link channel communicatable with the radio interface section 103 as soon as the incoming call directed to its own telephone number is received. (Step #316)

After establishing the radio link channel, a series of procedures (i.e. three steps of RT call-in request, CC setup and CC setup acceptance specified in Steps #317, #318 and #319) is performed through the radio link channel between the radio interface section 103 and the handy phone 116 for confirming an acceptance of the incoming call. Subsequently, another series of procedures (i.e. three steps of RT/MM function request, MM authentication request and MM authentication response specified in Steps #320, #321 and #322) is performed through the radio link channel between the radio interface section 103 and the handy phone 116 for confirming mutual connection through interfaces.

When the procedures of confirming connection between the handy phone 116 and the radio interface section 103 are once finished, a setup acceptance signal indicating acceptance of the incoming call is transmitted from the radio interface section 103 to the control section 106 in the private branch exchange 100. The control section 106 then transmits the setup acceptance signal to the control section 112 in the public radio base station 108. (Step #322)

Upon receiving the setup acceptance signal, the control section 112 sends a setup acceptance signal indicating acceptance of the incoming call to the public network K (Step #322), and also carries out a procedure (i.e. two steps of authentication request and authentication response specified in Steps #323 and #324) between the control section 112 and the authentication center 120 via the line interface section 109 for checking as to whether the handy phone 116 is a registered subscriber for the public radio telephone service. Meanwhile, if the procedures specified by the steps #315 through #322 confirm the mutual connection on the radio interfaces, the handy phone 116 starts ringing the bell and notifies a caller of it (i.e. CC alerting in Step #325).

Next, upon receiving a response from the handy phone 116 (i.e. CC response in Step #326), the control section 106 transmits a response signal to the control section 112 in the public radio base station 108, while making the communication path switching section 110 form a communication channel 115 to the radio interface section 111. On the other hand, the control section 112 having received a response from the handy phone 116 causes the communication path switching section 102 to connect the line interface section 101 and the communication channel 115, while sending a response to the public network K (Step #326). In return, a response confirmation signal is transmitted from the public network K to the line interface 109, the control section 112, the control section 106 and the radio interface section 103, successively. Thus, the radio interface section 103 sends the handy phone 116 a CC response confirmation signal, thereby establishing a communication enabling condition (Step #327).

Figure 4:
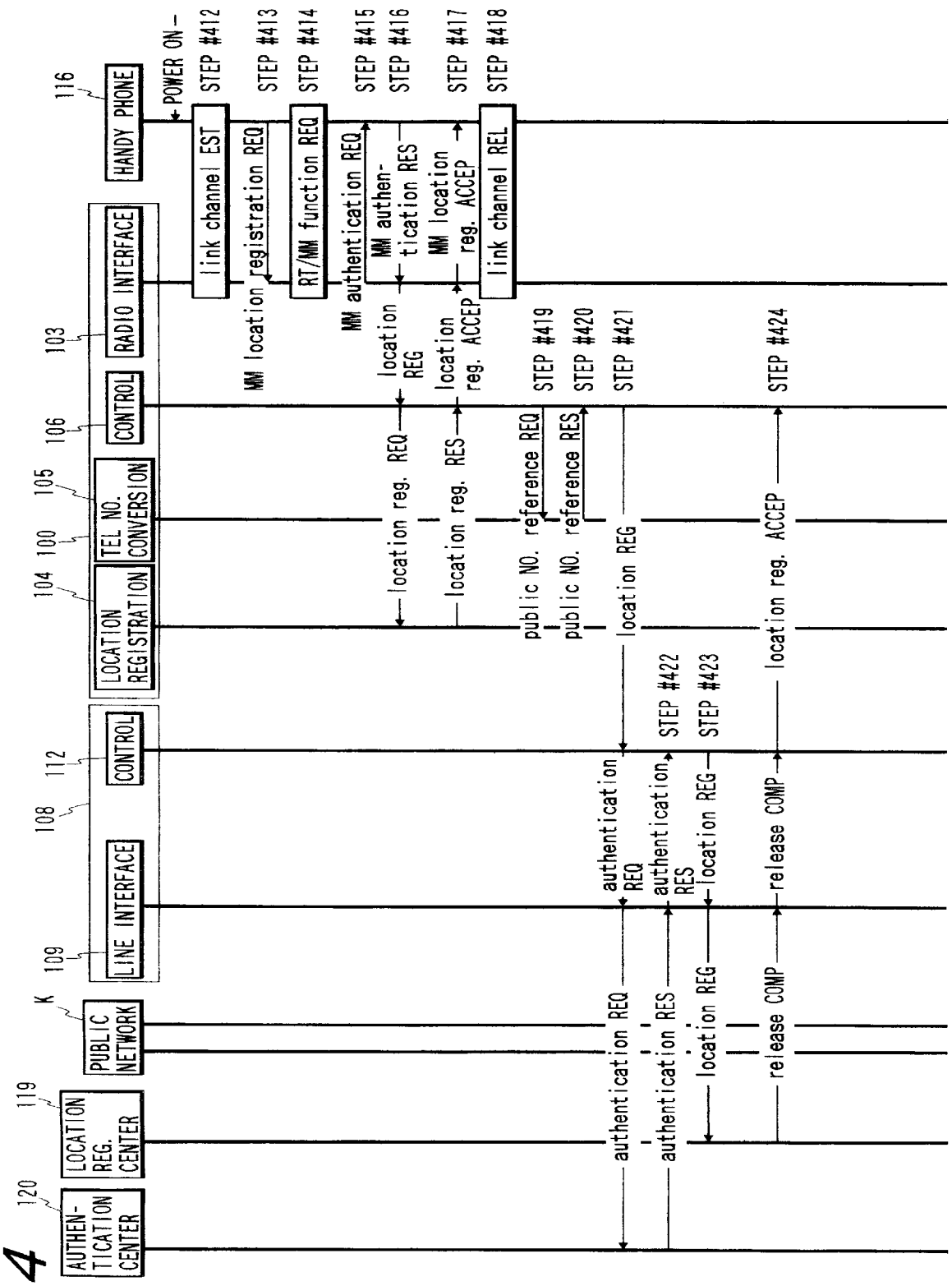
FIG. 4 is a sequence diagram showing a location registration from a private branch exchange (PBX) to a public base station in accordance with the embodiment of the present invention.

Next, FIG. 4 is a sequence diagram showing a location registration from a private branch exchange (PBX) to the public radio base station. This procedure is automatically executed by the private branch exchange (PBX) when the handy phone makes a location registration by turning on power in the private communication zone of the private branch exchange (PBX). First, when the handy phone 116 is turned on, the handy phone 116 requests an establishment of a link channel between the handy phone 116 and the radio interface section 103 in the private branch exchange 100 (Step #412). Next, the handy phone 116 requests a location registration (Step #413). Subsequently, a series of procedures (i.e. three steps of RT/MM function request, MM authentication request and MM authentication response specified in Steps #414, #415 and #416) is performed through the radio link channel between the radio interface section 103 and the handy phone 116 for confirming mutual connection through interfaces. Then, the radio interface section 103 performs a location registration to the location registration section 104 through the control section 106. The location registration section 104 returns a location registration response to the control section 106, thus the control section 106 notifies the radio interface section 103 of an acceptance of location registration. The result of acceptance of location registration is then transmitted to the handy phone 116, thereby accomplishing the location registration of the handy phone 116 as a phone belonging to the private communication zone 117 of the private branch exchange 100. (Steps #416 and #417)

After that, the link channel is released upon completion of the above location registration (Step #418). The control section 106, after having finished the above procedures, requests the telephone number conversion section 105 to check the public telephone number of the handy phone 116 (Steps #419 and #420), and thereafter requests the control section 112 in the public radio base station 108 to execute a location registration as a public telephone number (Step #421). The control section 112, in response to this request, performs an authentication procedure to the authentication center 120 through the line interface section 109 and the public network K. After confirming that the inquired public telephone number belongs to a proper subscriber (Steps #421 and #422), the control section 112 requests the location register center 119 to execute a location registration of this public telephone number (Step #423). When the location registration is finished, the control section 112 of the public radio base station 108 notifies the control section 106 of the private branch exchange 100 of an acceptance of the location registration (Step #424).

Through the above procedures, it becomes feasible that the handy phone responds to any incoming call directed to its own public telephone number registered in the public radio base station, even if the handy phone goes out of the public communication zone and moves into a private communication zone, or even if the communication mode of the handy phone is switched to a private mode dedicated to the private radio telephone service which dose not monitor the incoming-call notifying channel.

Furthermore, even if a user of the handy phone continuously stays in a private communication zone, it is possible to automatically execute a location registration in the public communication zone as soon as the location registration is done in the private communication zone.

Although the FIG. 1 embodiment shows a combination of only one private branch exchange 100 and a public radio base station 108, it is needless to say that a plurality of private branch exchanges can be combined with a public radio base station.

With the above arrangement, when the handy phone goes out of the public communication zone, after having been executed; and a location registration in the public radio base station, and moved into a private communication zone, or when the communication mode of the handy phone is switched to a private mode dedicated to the private radio telephone service not monitoring the incoming-call notifying channel, the private branch exchange (PBX) automatically converts the incoming call directed to the public telephone number registered in the public radio base station to an incoming call directed to a corresponding extension telephone number in the private branch exchange (PBX) with reference to the connection between the public telephone numbers and the extension telephone numbers administrated by the phone number conversion section.

Moreover, when a user of the handy phone continuously stays in a particular private communication zone provided by a private branch exchange (PBX), the private branch exchange (PBX) automatically executes a location registration for the public communication zone at the same time as completion of the location registration in the private communication zone.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A portable handy phone system comprising a first radio base station connected to a telephone network for causing portable handy phones subscribing to a first radio communication service to receive telephone calls on a first radio communications zone, and a second radio base station connected to said telephone network for causing portable handy phones subscribing to a second radio communication service different from said first radio communication service to receive telephone calls in a second radio communications zone geographically different from said first radio communications zone, wherein said first radio base station comprises:

a first radio interface section for executing radio communication with portable handy phones in said first radio communication zone dedicated to said first radio communication service;

a first system-to-system interface section for communicating with a second radio base station; and a first control section for responding to an incoming call received from said telephone network with information designating a portable handy phone having a first network address effective for said first radio communication service and a second network address different from said first network address and effective for said second radio communication service, causing the designated portable handy phone to receive said incoming call through said first radio interface section when said incoming call designates said first network address, and causing said first system-to-system interface section to transmit said information relating to said designated portable handy phone to said second radio base station for conversion of the network address, thereby allowing said designated portable handy phone to receive said incoming call even when said designated portable handy phone is in said second radio communication zone dedicated to said second radio communication service.

2. The portable handy phone system defined by claim 1, wherein said first radio communication zone is a public communication zone.

3. The portable handy phone system defined by claim 2, wherein said second radio base station is a private branch exchange allowing portable handy phones to execute radio communication in a private communication zone serving as said second radio communication zone.

4. The portable handy phone system defined by claim 3, wherein said information relating to said designated portable handy phone, transmitted from said first system-to-system interface section to said second radio base station, is a telephone number of said designated portable handy phone effective in said first radio communication zone.

5. The portable handy phone system defined by claim 3, wherein said second radio base station comprises:

a second system-to-system interface section for communicating with said first system-to-system interface section;

a second radio interface section for executing radio communication with portable handy phones in said second radio communication zone; and a second control section for controlling said second radio interface section to allow a corresponding portable handy phone in said second radio communication zone to receive the incoming call, when said second system-to-system interface section receives said information relating to said designated portable handy phone transmitted from said first system-to-system interface section.

6. The portable handy phone system defined by claim 2, wherein said information relating to said designated portable handy phone, transmitted from said first system-to-system interface section to said second radio base station, is a telephone number of said designated portable handy phone effective in said first radio communication zone.

7. The portable handy phone system defined by claim 2, wherein said second radio base station comprises:

a second system-to-system interface section for communicating with said first system-to-system interface section;

a second radio interface section for executing radio communication with portable handy phones in said second radio communication zone; and a second control section for controlling said second radio interface section to allow a corresponding portable handy phone in said second radio communication zone to receive the incoming call, when said second system-to-system interface section receives said information relating to said designated portable handy phone transmitted from said first system-to-system interface section.

8. The portable handy phone system defined by claim 1, wherein said information relating to said designated portable handy phone, transmitted from said first system-to-system interface section to said second radio base station, is a telephone number of said designated portable handy phone effective in said first radio communication zone.

9. The portable handy phone system defined by claim 1, wherein said second radio base station comprises:

a second system-to-system interface section for communicating with said first system-to-system interface section;

a second radio interface section for executing radio communication with portable handy phones in said second radio communication zone; and a second control section for controlling said second radio interface section to allow a corresponding portable handy phone in said second radio communication zone to receive the incoming call, when said second system-to-system interface section receives said information relating to said designated portable handy phone transmitted from said first system-to-system interface section.

10. The portable handy phone system defined by claim 9, wherein said information relating to said designated portable handy phone, transmitted from said first system-to-system interface section to said second radio base station, is a telephone number of said designated portable handy phone effective in said first radio communication zone.

11. The portable handy phone system defined by claim 9, wherein
- said second radio base station comprises a conversion section for converting said information relating to said designated portable handy phone transmitted from said first radio base station into an information relating to said corresponding portable handy phone effective in said second radio communication zone; and
- said second control section controls said conversion section in response to reception of said information relating to said designated portable handy phone transmitted from said first system-to-system interface section to said second system-to-system interface section, so as to obtain a converted information representing said corresponding portable handy phone, allowing said corresponding portable handy phone to receive the incoming call based on said converted information.

12. The portable handy phone system defined by claim 11, wherein
- said information relating to said designated portable handy phone, transmitted from said first system-to-system interface section to said second radio base station, is a telephone number of said designated portable handy phone effective in said first radio communication zone, and
- said conversion section converts said telephone number of said designated portable handy phone effective in said first radio communication zone into a telephone number of said corresponding portable handy phone effective in said second radio communication zone.

13. A portable handy phone system comprising a first radio base station connected to a telephone network for providing a first radio communication service having a first radio communication zone, a second radio base station connected to said telephone network for providing a second radio communication service different from said first radio communication service and having a second radio communication zone geographically different from said first radio communication zone, and a portable handy phone having a first network address for receiving telephone calls from said first radio base station in said first radio communication zone and a second network address different from said first network address for receiving telephone calls from said second radio base station in said second radio communication zone, wherein said first radio base station comprises:
- a first radio interface section for executing radio communication with said portable handy phone;
- a first system-to-system interface station for communicating with said second radio base station; and
- a first control section for responding to an incoming call received from said telephone network with information designating said first network address of said portable handy phone, causing said portable handy phone to receive said incoming call through said first radio interface section, and causing said first system-to-system interface to transmit said information relating to said portable handy phone to said second radio base station for conversion of the network address, thereby allowing said designated portable handy phone to receive the incoming call even when the designated portable handy phone is in said second radio communication zone.

14. The portable handy phone system defined by claim 13, wherein said first radio communication zone is a public communication zone.

15. The portable handy phone system defined by claim 14, wherein said second radio base station is a private branch exchange allowing portable handy phones to execute radio communication in a private communication zone serving as said second radio communication zone.

16. The portable handy phone system defined by claim 13, wherein said information relating to said portable handy phone, transmitted from said first system-to-system interface section to said second radio base station, is a telephone number of said portable handy phone effective in said first radio communication zone.

17. The portable handy phone system defined by claim 13, wherein said second radio base station comprises:
- a second system-to-system interface section for communicating with said first system-to-system interface section;
- a second radio interface section for communicating with said portable handy phone in said second radio communication zone; and
- a second control section for controlling said second radio interface section to allow said portable handy phone in said second radio communication zone to receive the incoming call, when said second system-to-system interface section receives said information relating to said portable handy phone transmitted from said first system-to-system interface section.

18. The portable handy phone system defined by claim 17, wherein said information relating to said portable handy phone, transmitted from said first system-to-system interface section to said second radio base station, is a telephone number of said portable handy phone effective in said first radio communication zone.

19. The portable handy phone system defined by claim 18, wherein
- said second radio base station comprises a conversion section for converting said telephone number of said portable handy phone effective in said first radio communication zone into a telephone number of said portable handy phone effective in said second radio communication zone; and
- said second control section controls said conversion section in response to reception of said telephone number of said portable handy phone effective in said first radio communication zone transmitted from said first system-to-system interface section to said second system-to-system interface section, so as to obtain said telephone number of said portable handy phone effective in said second radio communication zone, allowing said portable handy phone to receive the incoming call based on said obtained telephone number.

20. The portable handy phone system defined by claim 14, wherein said information relating to said portable handy phone, transmitted from said first system-to-system interface section to said second radio base station, is a telephone number of said portable handy phone effective in said first radio communication zone.

21. The portable handy phone system defined by claim 14, wherein said second radio base station comprises:
- a second system-to-system interface section for communicating with said first system-to-system interface section;
- a second radio interface section for communicating with said portable handy phone in said second radio communication zone; and
- a second control section for controlling said second radio interface section to allow said portable handy phone in said second radio communication zone to receive the incoming call, when said second system-to-system interface section receives said information relating to said portable handy phone transmitted from said first system-to-system interface section.

22. The portable handy phone system defined by claim 15, wherein said information relating to said portable handy phone, transmitted from said first system-to-system interface section to said second radio base station, is a telephone number of said portable handy phone effective in said first radio communication zone.

23. The portable handy phone system defined by claim 15, wherein said second radio base station comprises:

a second system-to-system interface section for communicating with said first system-to-system interface section;

a second radio interface section for communicating with said portable handy phone in said second radio communication zone; and a second control section for controlling said second radio interface section to allow said portable handy phone in said second radio communication zone to receive the incoming call, when said second system-to-system interface section receives said information relating to said portable handy phone transmitted from said first system-to-system interface section.

* * * * *